United States Patent
Jankowski et al.

(10) Patent No.: US 7,093,425 B2
(45) Date of Patent: Aug. 22, 2006

(54) VARIABLE FLOW REGULATOR FOR USE WITH CATALYTIC CONVERTERS

(75) Inventors: Paul E. Jankowski, Goodrich, MI (US); Stephen J. Myers, Owosso, MI (US)

(73) Assignee: Delphi Technologies, Inc., Troy, MI (US)

(*) Notice: Subject to any disclaimer, the term of this patent is extended or adjusted under 35 U.S.C. 154(b) by 0 days.

(21) Appl. No.: 11/088,034

(22) Filed: Mar. 23, 2005

(65) Prior Publication Data

US 2005/0160719 A1 Jul. 28, 2005

Related U.S. Application Data

(62) Division of application No. 09/737,844, filed on Dec. 15, 2000, now Pat. No. 6,887,439.

(51) Int. Cl.
*F01N 3/00* (2006.01)

(52) U.S. Cl. ............... 60/284; 60/288; 60/300; 60/324

(58) Field of Classification Search ............ 60/284, 60/288, 300, 312, 324; 422/168, 176
See application file for complete search history.

(56) References Cited

U.S. PATENT DOCUMENTS

| | | | | |
|---|---|---|---|---|
| 2,486,007 A | * | 10/1949 | Culp | 137/455 |
| 3,141,519 A | * | 7/1964 | Bottum | 181/241 |
| 3,870,083 A | * | 3/1975 | Nezat | 138/45 |
| 5,307,628 A | * | 5/1994 | Castagne | 60/284 |
| 6,075,298 A | | 6/2000 | Maue et al. | |
| 6,101,889 A | | 8/2000 | Laskey | |
| 6,107,759 A | | 8/2000 | Miller | |
| 6,159,430 A | | 12/2000 | Foster | |
| 6,178,745 B1 | * | 1/2001 | Meusen | 60/312 |
| 6,338,827 B1 | | 1/2002 | Nelson et al. | |
| 6,354,903 B1 | | 3/2002 | Nelson | |
| 6,361,821 B1 | | 3/2002 | Anderson et al. | |
| 6,391,822 B1 | | 5/2002 | Dou et al. | |
| 6,438,839 B1 | | 8/2002 | Hardesty et al. | |
| 6,455,463 B1 | | 9/2002 | Labarge et al. | |
| 6,464,945 B1 | | 10/2002 | Hemingway | |
| 6,464,947 B1 | | 10/2002 | Balland | |
| 6,497,847 B1 | | 12/2002 | Foster et al. | |
| 6,532,659 B1 | | 3/2003 | DeSousa et al. | |
| 6,591,497 B1 | | 7/2003 | Foster et al. | |
| 6,605,259 B1 | | 8/2003 | Henry | |
| 6,623,704 B1 | | 9/2003 | Roth | |
| 6,732,510 B1 | * | 5/2004 | Ciray | 60/312 |
| 6,887,439 B1 | * | 5/2005 | Jankowski et al. | 422/179 |
| 6,901,752 B1 | * | 6/2005 | Uhler et al. | 60/312 |

FOREIGN PATENT DOCUMENTS

WO WO 96/33891 10/1996

* cited by examiner

*Primary Examiner*—Tu M. Nguyen
(74) *Attorney, Agent, or Firm*—Paul L. Marshall

(57) ABSTRACT

A variable flow regulator assembly includes a first stationary exhaust pipe, a second stationary exhaust pipe concentrically disposed within the first stationary exhaust pipe, and a movable exhaust pipe concentrically disposed between the first and second stationary exhaust pipes. The first stationary exhaust pipe includes one or more interference tabs concentrically and circumferentially fitted about its interior surface. The movable exhaust pipe includes one or more interference tabs concentrically and circumferentially fitted about its exterior surface. The interference tabs complimentarily interact and restrict the movement of the variable flow regulator so that the flow maldistribution of the exhaust gas stream entering the catalytic converter can be variably controlled.

14 Claims, 6 Drawing Sheets

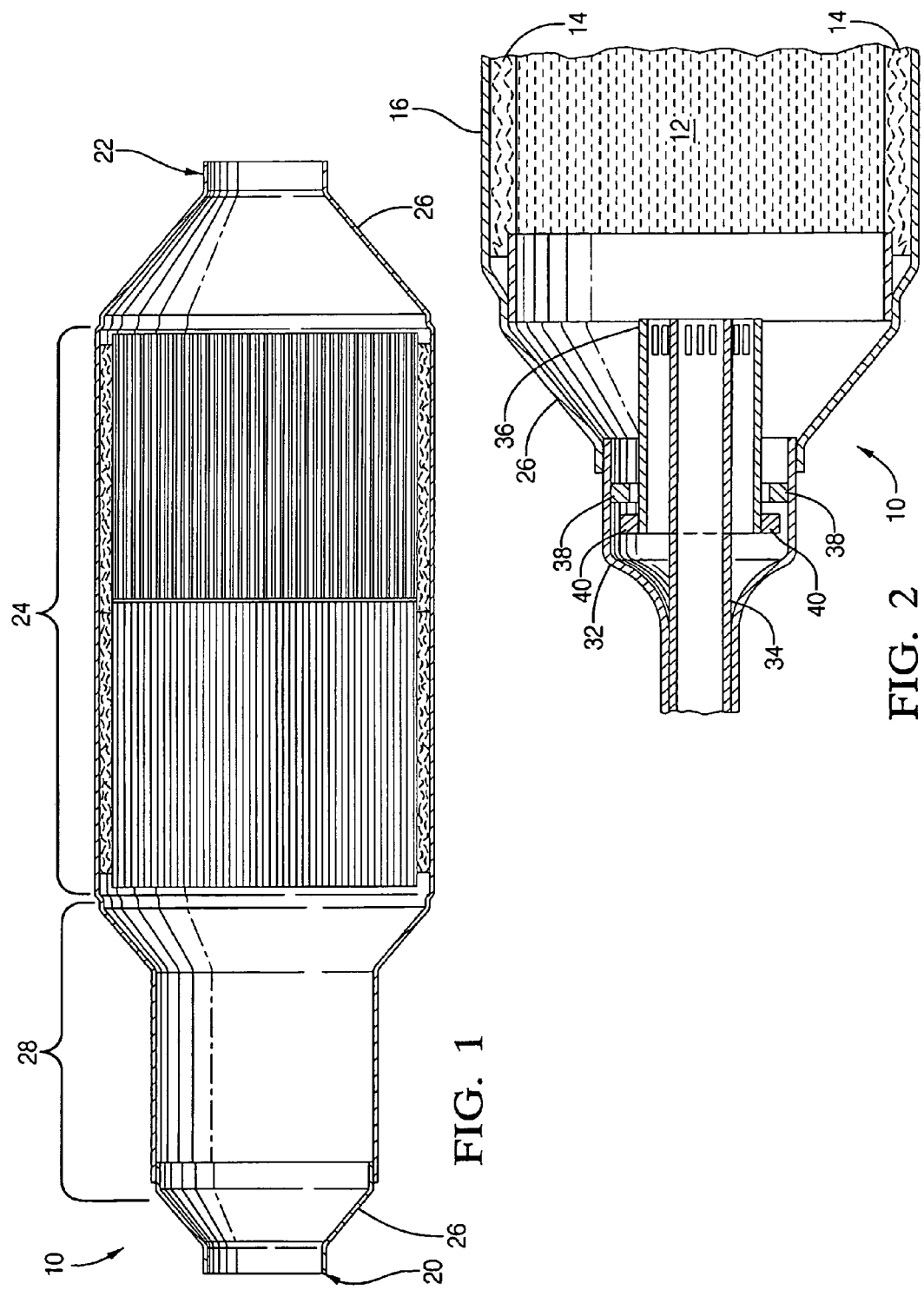

VARIABLE FLOW REGULATOR FOR USE WITH CATALYTIC CONVERTERS

This application is a division of application Ser. No. 09/737,844, filed on Dec. 15, 2000, now U.S. Pat. No. 6,887,439.

TECHNICAL FIELD

The disclosure relates to catalytic converters for mobile vehicles and, more particularly, to an apparatus and method for improving catalytic converter performance.

BACKGROUND

The reduction of emissions from vehicle exhaust systems is a well known problem. As the number of vehicles having an internal combustion engine continues to increase, the problem is becoming more severe and despite the introduction of catalytic converter exhaust systems, the exhaust emissions from vehicles fitted with such systems are still relatively high.

In particular exhaust emissions are relatively high during the initial warm-up phase, also referred to as the "cold start", of an internal combustion engine after starting, especially with regard to the emissions of carbon monoxide, oxides of nitrogen and hydrocarbons. Cold start conditions refer to when the catalytic converter is not operating. For example, this could be on a cold winter day when the temperature is −10° C. or on a summer day when the ambient temperature is 30° C. The catalytic converter must be heated to approximately 250° C. before it becomes operable to convert the combustion by-products of the internal combustion engine. Normal operating temperature is in the 400° C. to 800° C. range. For the internal combustion engine to meet the Federal Test Procedure for the new stringent exhaust requirements, the catalyst must come up to temperature as quickly as possible.

The particularly high exhaust emissions are largely due to the fact that the catalytic converter has not reached its so-called "light-off" temperature, at which the catalyst causes the required catalytic reactions to take place. The light-off temperature can be defined as the temperature at which the catalytic converter reaches 50% conversion. Modern catalyst systems start operating at temperatures of around 200° C. to 300° C.

In order to reduce the quantity of harmful emissions during the initial warm-up phase, a plurality of different solutions has been proposed, many of these solutions being based on shortening the time taken to reach the light-off temperature by raising the temperature in the catalyst as fast as possible. During a cold start, this can be achieved by generating increased heat energy into the exhaust system, which subsequently causes the catalyst to be rapidly heated.

A previously known arrangement for obtaining this reduction in time for the light-off temperature to be reached is one comprising an electrically heated catalyst, which is arranged upstream from the main catalyst. However, this arrangement implies certain drawbacks. Firstly, the cost for a heatable catalyst substrate is considerable. Furthermore, the consumption of electrical energy is relatively high. An additional power supply such as an extra battery may be required in the vehicle. Also, the durability of the electrically heatable catalyst substrate may constitute a problem.

Consequently, there exists a need for a catalytic converter that can accelerate catalyst light-off time without increasing the emissions from the vehicle's exhaust system.

SUMMARY

The drawbacks and disadvantages of the prior art are overcome by the exemplary embodiments of the variable flow regulator, catalytic converter, and method for achieving light-off in a catalytic converter. The variable flow regulator assembly comprises a first exhaust pipe having at least one interference tab concentrically and circumferentially disposed on an interior surface of the first exhaust pipe, a second exhaust pipe concentrically disposed within the first exhaust pipe, and a movable exhaust pipe having at least one interference tab concentrically and circumferentially disposed on an exterior surface of the exhaust pipe. An actuation mechanism is in communication with the first exhaust pipe, the second exhaust pipe and the movable exhaust pipe. The movable exhaust pipe concentrically disposed about the second exhaust pipe, and between the first exhaust pipe and the movable exhaust pipe.

The catalytic converter comprises a catalyst substrate comprising a catalyst, a shell having an opening, and the shell is concentrically disposed around said catalyst substrate, a mat support material disposed between the catalyst substrate and the shell, and concentrically around the catalyst substrate, and a variable flow regulator concentrically disposed within the shell. An end cone assembly is attached to the variable flow regulator assembly. The variable flow regulator assembly comprises a first exhaust pipe, a second exhaust pipe concentrically disposed within the first exhaust pipe, and a movable exhaust pipe concentrically disposed between the first exhaust pipe and the second exhaust pipe.

A method for achieving light-off in a catalytic converter comprises activating the catalytic converter under cold start conditions. Exhaust gas is introduced into the catalytic converter through a variable flow regulator attached thereto, wherein the variable flow regulator comprises a first exhaust pipe having at least one interference tab concentrically and circumferentially disposed on an interior of the first exhaust pipe, a second exhaust pipe concentrically disposed within the first exhaust pipe, and a movable exhaust pipe having at least one interference tab disposed concentrically and circumferentially on an exterior of said movable exhaust pipe, and disposed concentrically between the first exhaust pipe and the second exhaust pipe. The flow maldistribution is controlled using the variable flow regulator. Light-off is achieved in the catalytic converter.

BRIEF DESCRIPTION OF THE DRAWINGS

Referring now to the figures, which are meant to be exemplary, not limiting, and wherein like elements are numbered alike in the several figures.

FIG. 1 is an exemplary embodiment of a catalytic converter;

FIG. 2 is a cross-sectional view of the catalytic converter of FIG. 1 having an exemplary embodiment of a variable flow regulator.

DESCRIPTION OF THE PREFERRED EMBODIMENT

Figure 3:
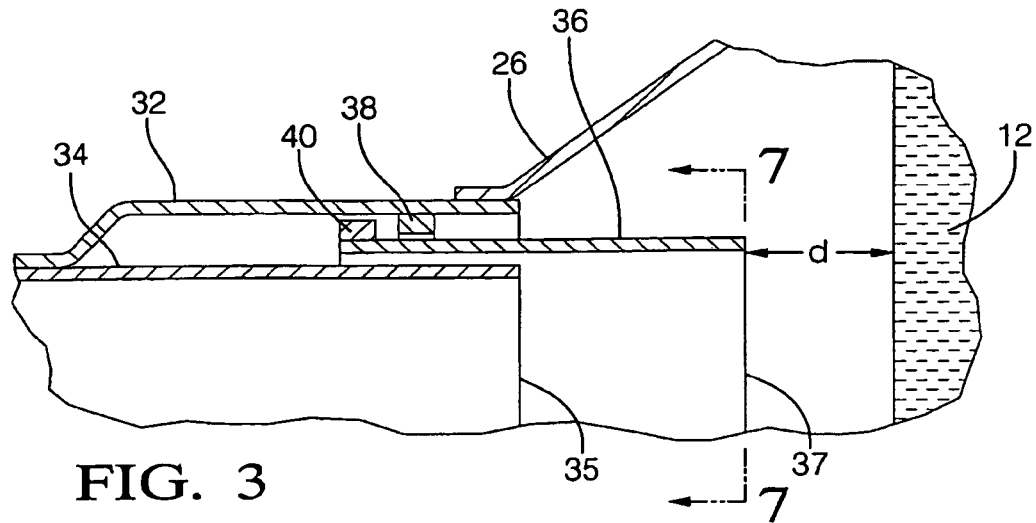
FIG. 3 is an enlarged partial cross-sectional view of the catalytic converter and variable flow regulator of FIG. 2 at a first position.

Under cold start conditions, maldistribution, that is an unsatisfactory distribution of exhaust elements, is high and the thermal content of the exhaust gas stream is focused upon a small thermal mass. The maldistribution can preferably be variably controlled using a variable flow regulator, as described herein, so that the initial high maldistribution is concentrated directly into the catalyst substrate. As a result the environmentally unfriendly elements of the exhaust gas are catalyzed more efficiently, and the catalytic converter reaches light-off more quickly.

In addition, as a conventional catalytic converter works to achieve light-off, a back pressure builds in the engine combustion chamber. When the conventional catalytic converter achieves light-off, the back pressure is suddenly reduced, and often times, to quickly for the engine to adjust the fuel to oxygen ratio, which correspondingly reduces the engine's performance i.e., reduced horsepower. The variable flow regulator described herein prevents the typical pressure drop and improves the engine's overall performance.

A catalytic converter having a variable flow regulator comprises a catalyst substrate comprising a catalyst. The catalyst substrate is disposed concentrically within a shell having an opening, and a mat support material is disposed concentrically between the catalyst substrate and shell, and around the catalyst substrate. The variable flow regulator is disposed within the opening at one end and secured within the shell and an endcone assembly, exhaust manifold cover, exhaust pipe, connecting pipe, or other exhaust system component, and the like. The shell is fitted to an end cone assembly, end plate, and the like, at the opposite end. The exhaust system component housing the variable flow regulator is attached to another exhaust system component such as an exhaust pipe, a coupling apparatus, a connecting pipe, an exhaust manifold assembly, combinations comprising at least one of the foregoing, and the like.

One exemplary embodiment of a variable flow regulator assembly comprises a first stationary exhaust pipe having one or more interference tabs circumferentially fitted about its interior surface, a second stationary exhaust pipe concentrically disposed within the first stationary exhaust pipe, and a movable exhaust pipe concentrically disposed between the exterior and interior exhaust pipes, and having one or more interference tabs concentrically and circumferentially fitted about its exterior surface. The movable exhaust pipe telescopically extends and retracts from a first position to a second position, and to a third position, or back to a first position, along the length of the second stationary exhaust pipe, and between the first and second stationary exhaust pipes, so that the exhaust gas flow can be variably controlled. The interference tabs of the first and movable exhaust pipes interact to restrict the movement of the movable exhaust pipe Another exemplary embodiment of a variable flow regulator assembly comprises a first stationary exhaust pipe, a second stationary exhaust pipe concentrically disposed within the first stationary exhaust pipe, and a movable exhaust pipe concentrically disposed between the first and second stationary exhaust pipes. In this particular embodiment, the movable exhaust pipe rotates about the second stationary exhaust pipe to variably control the flow maldistribution of environmentally unfriendly exhaust gas elements into the catalytic converter. Both the movable exhaust pipe and second stationary exhaust pipe include a plurality of concentrical and circumferential slots disposed about an end or outlet of both the second and movable exhaust pipes. As the movable exhaust pipe rotates about the second stationary exhaust pipe from a first position to a second position, and to a third position, or back to a first position, both sets of slots interact to variably control the flow of the exhaust gas stream upon entering the catalytic converter. The first stationary exhaust pipe includes one or more interference tabs circumferentially and concentrically fitted about its interior surface. The movable exhaust pipe also includes one or more interference tabs circumferentially and concentrically fitted about its exterior surface. The interference tabs of the first and movable exhaust pipes engage and interact to restrict the rotational movement of the variable flow regulator.

A catalytic converter 10 comprises at least one catalyst substrate 12. The catalyst substrate 12 can comprise any material designed for use in a spark ignition or diesel engine environment, and have the following characteristics: (1) capable of operating at temperatures up to about 1,000° C., (2) capable of withstanding exposure to hydrocarbons, nitrogen oxides, carbon monoxide, carbon dioxide, and/or sulfur, and (3) have sufficient surface area and structural integrity to support the desired catalyst. Some possible materials include cordierite, silicon carbide, metallic foils, alumina sponges, porous glasses, and the like, and mixtures comprising at least one of the foregoing. Some ceramic materials include "HONEY CERAM", commercially available from NGK-Locke, Inc, Southfield, Mich., and "CELCOR", commercially available from Corning, Inc., Corning, N.Y.

Although the catalyst substrate 12 can have any size or geometry, the size and geometry are preferably chosen to optimize the surface area in the given converter design parameters. Typically, the catalyst substrate 12 has a honeycomb geometry, with the combs being any multi-sided or rounded shape, with substantially square, hexagonal, octagonal or similar geometries preferred due to ease of manufacturing and increased surface area.

Disposed on and/or throughout the catalyst substrate 12 is a catalyst for converting exhaust gases to acceptable emissions levels as is known in the art. The catalyst may comprise one or more catalyst materials that are wash coated, imbibed, impregnated, physisorbed, chemisorbed, precipitated, or otherwise applied to the catalyst substrate. Possible catalyst materials include noble metals, such as platinum, palladium, rhodium, iridium, osmium and ruthenium; other metals, such as tantalum, zirconium, yttrium, cerium, nickel, copper and the like; metal oxides; and mixtures comprising of at least one of the foregoing, and other conventional catalysts. The catalyst can optionally include a base metal oxide for the reduction of nitrogen oxides.

Located in between the catalyst substrate 12 and a catalytic converter shell 16 is a mat support material 14 that insulates the shell 16 from both high exhaust gas temperatures and the exothermic catalytic reaction occurring within the catalyst substrate 12. The mat support material 14, which enhances the structural integrity of the catalyst substrate 12 by applying compressive radial forces about it, reducing its axial movement, and retaining it in place, is concentrically disposed around the catalyst substrate 12 to form a mat support material/catalyst substrate subassembly. The mat support material 14 can either be a simple non-intumescent material, or an intumescent material, e.g., one which contains a vermiculite component that expands with heating to maintain firm uniform compression when the shell expands outward from the catalyst substrate, as well as materials which include a combination of both. Typical non-intumescent materials include ceramic materials, and other conventional materials such as an organic binder and the like, or combinations comprising at least one of the foregoing, such as those sold under the trademarks "NEXTEL" and "SAFFIL" by the "3M" Company, Minneapolis, Minn., or those sold under the trademark, "FIBERFRAX" and "CC-MAX" by the Unifrax Co., Niagara Falls, N.Y., and the like. Intumescent materials, which include ceramic materials, vermiculite, or combinations comprising at least one of the foregoing, may include other conventional materials such as organic binders and the like. Examples of intumescent materials include those sold under the trademark "INTERAM" by the "3M" Company, Minneapolis, Minn., as well as those intumescents which are also sold under the aforementioned "FIBERFRAX" trademark, as well as combinations thereof and others.

The mat support material/catalyst substrate subassembly is concentrically disposed within the shell 16. The shell 16 includes at least one opening 18 for receiving the mat support material/catalyst substrate subassembly. The choice of material for the shell 16 depends upon the type of exhaust gas, the maximum temperature reached by the catalyst substrate 12, the maximum temperature of the exhaust gas stream, and the like. Suitable materials for the shell 16 can comprise any material that is capable of resisting under-car salt, temperature and corrosion. Typically, ferrous material, and the like, is employed such as ferritic stainless steels. Some ferritic stainless steels include grades from the 400-Series such as SS-409, SS-439, and SS-441, with grade SS-409 generally preferred. More specifically, SS-409 possesses a thermal coefficient of expansion of about $17.3 \times 10^{-6}/°$ C. Based upon a $\Delta T$ of about 370° C., the SS-409 stainless steel composition expands about 0.006 mm. When utilized for the exhaust pipes in the present application, the circumference of an SS-409 exhaust pipe, having a diameter of approximately 0.75 mm, expands approximately 1.5 mm, which will not interfere with the movement of the variable flow regulator or the interaction of the interference tabs.

FIG. 1 illustrates an exemplary embodiment of the shell 16 of the instant application. The shell 16 can comprise a first end 20, a second end 22, and a containment area 24. An outer end cone 26 can be fitted to at least one end 20 or 22. Containment area 24 can be sized, such as, e.g. using a draw ring or other conventional means, and reduced in diameter to form a narrow cylindrical area 28 near the first end 20, where the variable flow regulator assembly can be mounted. At least one catalyst substrate 12 can preferably be disposed within the containment area 24, and near the cylindrical area 28, so that the variable flow regulator assembly can direct the exhaust gas stream into the center of the catalyst substrate 12.

Typically, the mat support material/substrate subassembly can be inserted into the shell 16 using a variety of methods. In the instant application, the subassembly can be placed in a stuffing cone, for example. The stuffing cone is a device that compresses the mat support material 14 concentrically about the catalyst substrate 12 using a ramming component. The ramming component stuffs the compressed mat support material/catalyst substrate subassembly into the shell 16 without peeling the mat support material 14 away from the catalyst substrate 12. The shell 16 can be compressively closed upon the mat support material/catalyst substrate subassembly by exerting a substantially uniform compressive stress, and complete the assembly of the catalytic converter 10.

In the alternative, a compressive sizing operation can be employed when the mat support material/catalyst substrate subassembly is disposed concentrically within the shell 16. The shell 16 can be compressively sized to achieve the desired mat pressure of the mat support material 14 to be exerted upon the catalyst substrate 12. Once the mat support material/catalyst substrate subassembly is disposed within the shell 16, an outer endcone 26 configured to receive a variable flow regulator can be attached to the shell 16 at opening 18 to provide a gas tight seal. The outer endcone 26 and variable flow regulator can attach to an exhaust system component such as an exhaust pipe, a connecting pipe, an exhaust manifold assembly, a coupling apparatus, combinations comprising at least one of the foregoing, other exhaust system components, and the like.

FIGS. 2–5 depict an exemplary embodiment of a catalytic converter 10 fitted with an exemplary embodiment of the variable flow regulator assembly. A first exemplary embodiment of a variable flow regulator assembly comprises a first stationary exhaust pipe 32, a second stationary exhaust pipe 34 concentrically disposed within the first stationary exhaust pipe 32, and a movable exhaust pipe 36 concentrically disposed between the first and second stationary exhaust pipes 32, 34. One or more interference tabs 38 are concentrically and circumferentially fitted about the interior surface of the first stationary exhaust pipe 32. In addition, one or more interference tabs 40 are concentrically and circumferentially fitted about the exterior surface of the movable exhaust pipe 36.

The interference tabs 38 of the first stationary exhaust pipe 32 preferably compliment the interference tabs 40 of the movable exhaust pipe 36. The interference tabs include a structural feature such as a joint configuration, tongue and groove, or one or more members that overlap, snap, engage, or interlock, or a device such as a magnetic or electronic locking mechanism for holding interference tabs 38 and 40 in a complimentary engagement. Under cold start conditions, the movable exhaust pipe 36 is preferably positioned at a resting position, such as, e.g., resting position A (See FIG. 3). At resting position A the movable exhaust pipe 36 is fully extended such that an outlet 37 of the movable exhaust pipe 36 can abut the catalyst substrate 12 or be placed a distance "d" from the catalyst substrate 12, and the interference tabs 38, 40 are engaged. By minimizing the distance between the intake area of the catalyst substrate 12 and the movable exhaust pipe 36, the high maldistribution can rapidly feed directly into the catalyst substrate 12. The catalyst substrate 12 can immediately begin catalyzing the exhaust elements, which causes the temperature of the catalyst substrate 12 to quickly rise from its initial cold start temperature.

Figure 4:
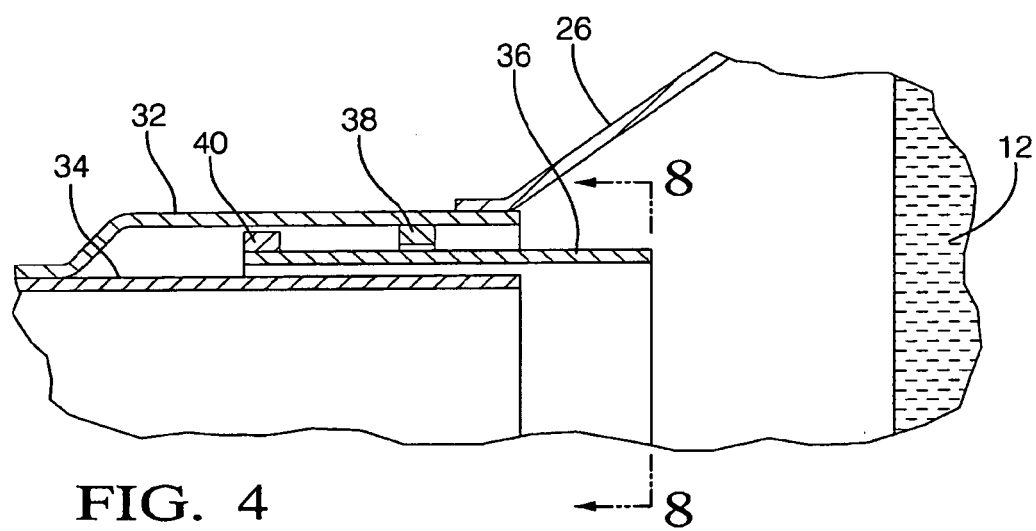
FIG. 4 is an enlarged partial cross-sectional view of the catalytic converter and variable flow regulator of FIG. 2 at a second position.
Figure 5:
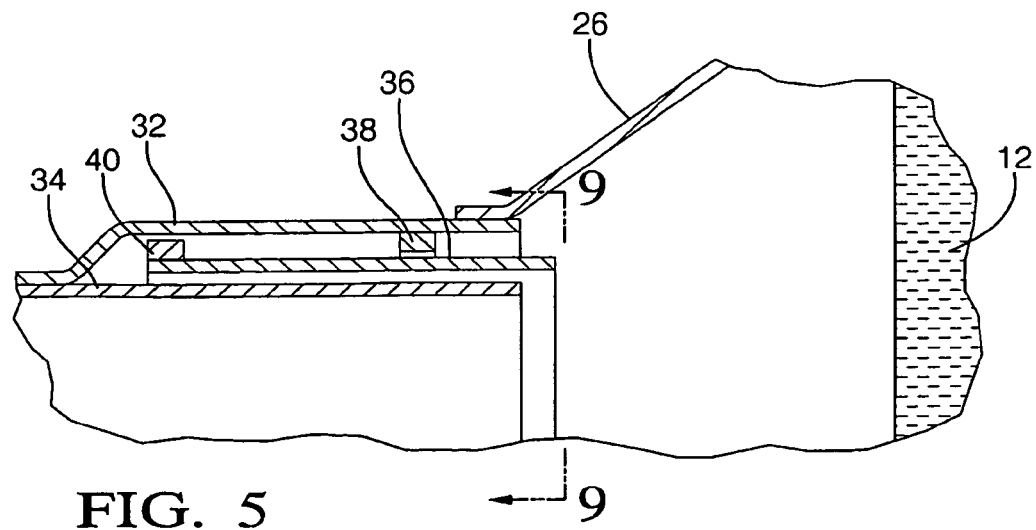
FIG. 5 is an enlarged partial cross-sectional view of the catalytic converter and variable flow regulator of FIG. 2 at a third position.
Figure 6:
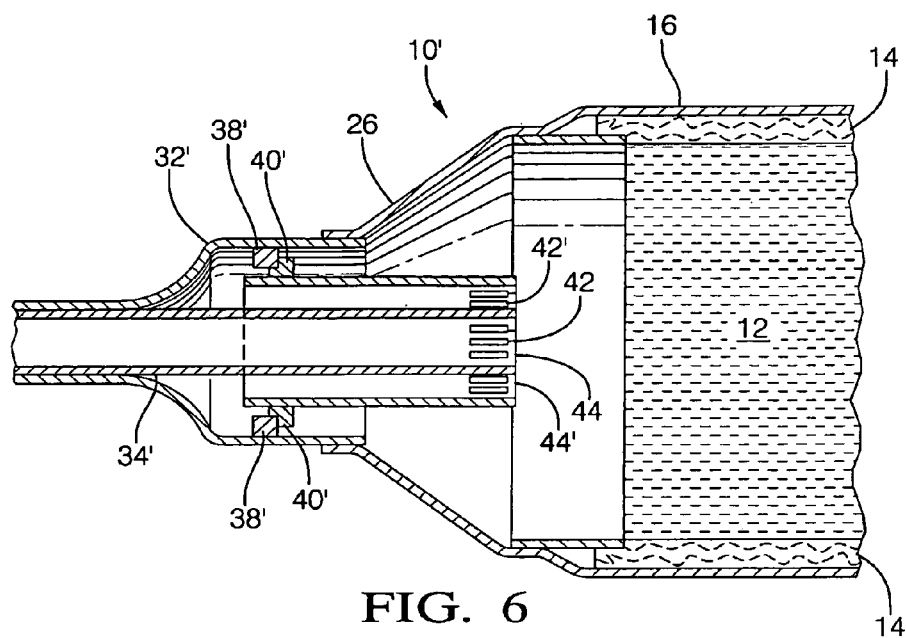
FIG. 6 is a cross-sectional view of an exemplary embodiment of a catalytic converter having an another exemplary embodiment of a variable flow regulator.
Figures 7, 8:
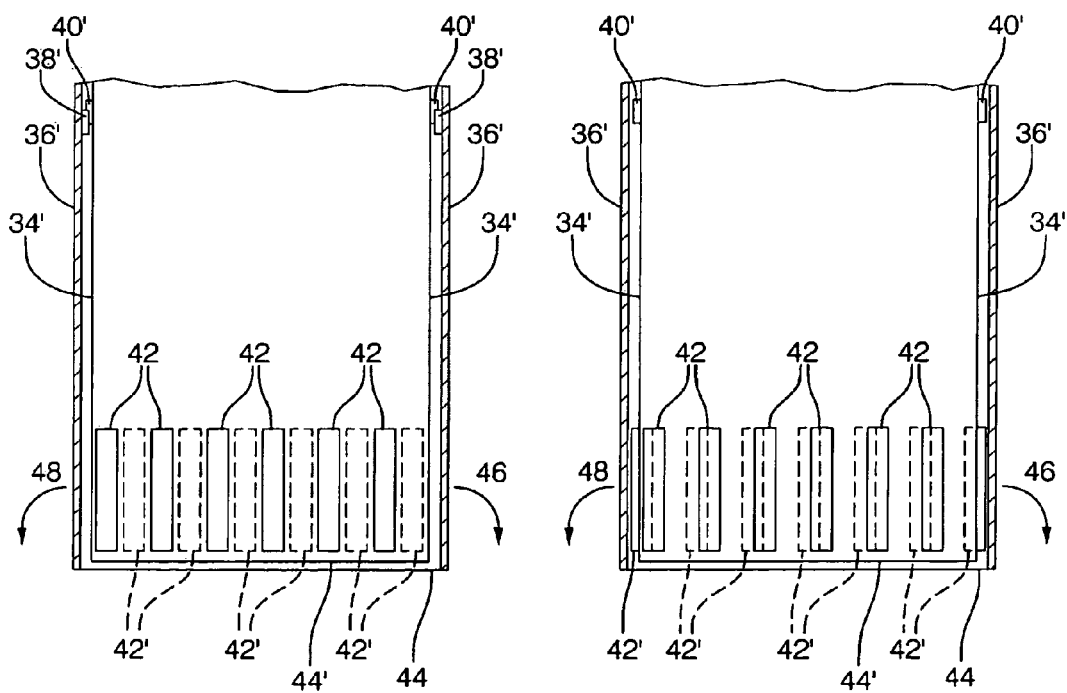
FIG. 7 is an enlarged partial cross-sectional view of the variable flow regulator of FIG. 6 at a first position.
FIG. 8 is an enlarged partial cross-sectional view of the variable flow regulator of FIG. 6 rotated clockwise to a second position.
Figure 9:
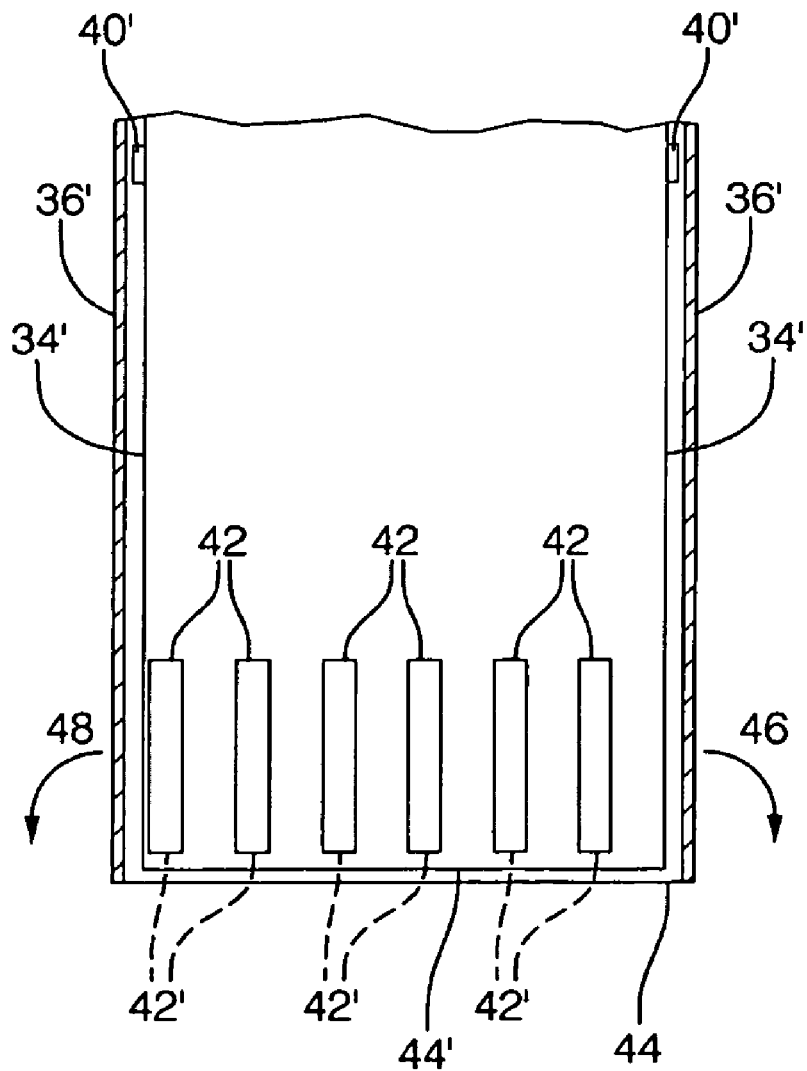
FIG. 9 is an enlarged partial cross-sectional view of the variable flow regulator of FIG. 6 rotated clockwise to a third position.

As the catalytic converter 10 warms and light-off is achieved, the movable exhaust pipe 36 is gradually retracted in a linear motion to a second position B, located anywhere along the path followed by the movable exhaust pipe 36 until reaching a resting position, such as, e.g., resting position C (See FIGS. 3–5). At resting position C, the outlet 37 of the movable exhaust pipe 36 substantially aligns with an outlet 35 of the second stationary exhaust pipe 34. The maldistribution and back pressure gradually decrease without detrimentally impacting the engine's performance, i.e., a decrease in horsepower or fuel efficiency. The variable flow regulator's movement is controlled by the engine control module. In the exemplary embodiment described herein, the engine control module controls the variable flow regulator's movement, and can determine when to adjust the movable exhaust pipe 36 in at least one of the two ways.

First, the engine control module can measure the manifold intake pressure to determine the engine load, while also monitoring the amount of time elapsed from starting the engine. The engine control module can calculate the conversion exotherm, or heat generated by the catalytic converter, and the back pressure in the combustion chamber based upon the aforementioned measurements. As the conversion exotherm increases, the entire exhaust system warms up and achieves thermal inertia, which overcomes the thermal mass of the system, or the overall temperature the exhaust system must reach to function efficiently. At this point, the catalytic converter achieves light-off, which is electronically sensed by the engine control module.

Second, the engine control module can monitor the oxygen content of the exhaust gas stream as it passes through the catalytic converter. Oxygen sensors can be mounted before and after the catalytic converter. As the exhaust gas stream flows through the catalytic converter, the first oxygen sensor measures the oxygen content prior to being catalytically treated. After passing through the catalytic converter, the oxygen content of the exhaust gas is measured a second time. The engine control module compares the measurements and determines whether the catalytic converter achieved light-off. Once the engine control module electronically senses that light-off has occurred, the engine control module adjusts the movable exhaust pipe by gradually retracting the pipe from position A to position B (See FIGS. 3–4).

As the catalytic converter achieves light-off, pressure builds in the engine combustion chamber. The gradual retraction of the movable exhaust pipe 36 from position A to position B, however, causes the pressure in the engine combustion chamber to gradually reduce. At the same time the exhaust gas stream flow becomes less restricted, which decreases and improves the flow maldistribution. The engine control module can monitor the pressure drop while continuing to electronically adjust the movable exhaust pipe from position B to position C (See FIGS. 4–5). Eventually, the engine control module and variable flow regulator will lower the pressure to a steady state operating level without experiencing a loss in horsepower or fuel efficiency.

The variable flow regulator can be extended and retracted using a mechanical or electrical actuation mechanism (not shown), remotely or mechanically operated, such as the type disclosed in U.S. Pat. No. 6,101,889 to Laskey, and incorporated herein by reference, and other devices designed to actuate or impart movement to a component in a linear direction. Laskey discloses a ball screw and nut linear actuator assembly. The ball screw and nut linear actuator has a motor and a ball nut and screw assembly in side by-side disposition. A plurality of gearing connects with the motor shaft to drive the screw. A housing for the gearing and ball nut and screw assembly includes an elongate housing tube within which the screw assembly is housed. The nut incorporates an extension sleeve assembly for extending movement out of the housing tube, which anchors the screw against axial movement while journaling it for rotation. A pin and axial track connection between the extension sleeve assembly and the housing tube guides the extension sleeve assembly in axial movement and prevents relative rotation of the housing tube and sleeve assembly. The ball screw and nut linear actuator assembly can be mounted within the first exhaust pipe 32, situated behind the third exhaust pipe 36, and between the first exhaust pipe 32 and second exhaust pipe 34. Alternatively, the actuator assembly can be encased in a housing and mounted as described, or mounted externally to the first exhaust pipe 32 in a sealed housing assembly to prevent leakage of exhaust gas from the exhaust system. The engine control module signals the mechanical actuation mechanism to extend and retract the third exhaust pipe 36, as the engine control module senses the catalytic converter approaching and achieving light-off.

The flow maldistribution and pressure of the exhaust gas stream can also be controlled in a variably uniform manner using another exemplary embodiment of a variable flow regulator configuration. Referring now to FIGS. 6–9, another exemplary embodiment of the catalytic converter 10 connected to a variable flow regulator assembly is depicted. The variable flow regulator assembly comprises a first stationary exhaust pipe 32', a second stationary exhaust pipe 34' concentrically disposed within the first stationary exhaust pipe 32', and a movable exhaust pipe 36' concentrically disposed between the first and second stationary exhaust pipes. The second stationary exhaust pipe 34' includes a plurality of slots 42 concentrically and circumferentially located about an outlet 44 of second stationary exhaust pipe 34'. One or more interference tabs 38' are concentrically and circumferentially fitted about the exterior surface of the second pipe 34'. The movable exhaust pipe 36' also includes a plurality of slots 42' concentrically and circumferentially located about an outlet 44'. In addition one or more interference tabs 40' are also concentrically and circumferentially fitted about the interior surface of the movable exhaust pipe 36'. The interference tabs 38', 40' preferably have the same features, and variations, as the aforementioned interference tabs 38, 40 of the previous exemplary embodiment. Interference tabs 38', 40' preferably engage one another to restrict the rotational movement of the movable exhaust pipe 36'about the second stationary exhaust pipe 34'. The movable exhaust pipe 36' rotates about the second stationary exhaust pipe 34' as an exhaust gas stream flows through the second stationary exhaust pipe 34' and into the catalytic converter 10'.

The rotational movement of this exemplary embodiment of the variable flow regulator is also controlled by the engine control module. The engine control module can determine whether to electronically adjust the variable flow regulator based upon the aforementioned methods discussed in the previous embodiment. When the engine control module determines that the catalytic converter has achieved light-off, the engine control module electronically adjusts the movable exhaust pipe 36' by gradually rotating it. The movable exhaust pipe 36' is preferably situated at position A under cold start conditions. At position A the slots 42 and 42' are preferably restricted or closed, and the interference tabs 38', 40' are engaged (See FIG. 7). Once light-off is achieved, the movable exhaust pipe 36' can gradually rotate in a clockwise direction of arrow 46 or counterclockwise direction of arrow 48 to a position B (See FIG. 8). Position B can be any position where the slots 42 and 42' begin to overlap and create several additional outlets for the exhaust gas stream to flow through. Meanwhile, the engine control module continuously monitors the pressure in the engine combustion chamber and gradually rotates the movable exhaust pipe 36' from position B to position C (See FIGS. 8–9). At position C the slots overlap each other and effectively create an outlet located approximately several inches before the original outlet of both the second stationary and movable exhaust pipes 34' and 36' (See FIG. 9). The thermal mass of the exhaust system achieves the operating temperature such that the catalytic reaction efficiently catalyzes the exhaust stream and lowers the flow maldistribution.

At that point, both sets of interference tabs 38', 40' engage each other to restrict the rotational movement of the movable exhaust pipe 36'. Again, the engine control module will electronically adjust the movable exhaust pipe 36' to position C so that the pressure in the engine combustion chamber achieves a steady state operating level without experiencing a loss in horsepower or fuel efficiency. The engine control module can then adjust and return the movable exhaust pipe 36' to position A when the vehicle shuts off.

The variable flow regulator can be rotated clockwise and counter-clockwise using a mechanical, electrical, or electromagnetic actuation mechanism (not shown), remotely or mechanically operated, that can impart intermittent or full rotational movement in either direction. Such mechanical, electrical or electromagnetic mechanisms can comprise a ball screw apparatus, which rather than translating the rotational movement into linear actuation, that is modified to replace the typical axle or screw with a linkage connected to the third exhaust pipe of the variable flow regulator assembly.

Another mechanical, electrical, or electromagnetic mechanism can comprise configuring the exterior of the third exhaust pipe with a concentrically disposed rotatable groove or plurality of grooves able to receive at least one ball bearing. A second concentrically disposed rotatable groove or plurality of grooves able to receive at least one ball bearing is placed on the interior of the first exhaust pipe, and parallel to the groove on the third exhaust pipe. The groove of the first exhaust pipe can be mechanically, electrically, or electromagnetically actuated so that it rotates about the interior of the first exhaust pipe in either a clockwise or counterclockwise motion. The clockwise or counterclockwise motion is then imparted to the ball bearing(s). The ball bearing(s) in turn impart a counter directional force to the third exhaust pipe through the groove, such that the third exhaust pipe rotates in a counterclockwise direction when acted upon by a ball bearing moving in a clockwise direction, and likewise, rotates in a clockwise direction when acted upon by a ball bearing moving in a counter-clockwise direction.

Yet another mechanical or electrical mechanism can comprise a modified multi-functional apparatus employing an intermittent motor mechanism such as the apparatus disclosed in WO/96,33891, U.S. Pat. No. 6,075,298, and U.S. Pat. No. 6,107,759. Multi-functional apparatus for vehicles typically operate several functions, such as a window wiper mechanism, front and rear window locks, and lift gate lock mechanisms, using intermittent rotational motion to move, for example, a window wiper side to side across a windshield. That same type of intermittent motor mechanism can be mounted within the exemplary variable flow regulator, and modified for remote actuation of the variable flow regulator alone, according to signals received from the engine control module.

For example, the output pinion of the rotatable member in FIG. 1a of U.S. Pat. No. 6,107,759, incorporated herein by reference, can be implemented with the third exhaust pipe, such that the third exhaust pipe can be equipped with a worm gear groove or plurality of worm gear grooves concentrically disposed about a portion of its exterior, and such grooves are placed in physical contact and communication with an output pinion for interaction with the rotatable member. As the rotatable member imparts a rotational movement to the output pinion, the third exhaust pipe rotates about the first exhaust pipe. The variable flow regulator can then operate independently to quickly achieve a quick catalyst light-off without the drawbacks associated with a strictly multi-functional motor mechanism, i.e., typically, when one function, such as a door lock, is impaired, then the remaining functions become impaired as well. The intermittent motor mechanism can be mounted within the first exhaust pipe 32', situated between the first exhaust pipe 32' and third exhaust pipe 36', and impart a rotational movement to the third exhaust pipe 36' in either a clockwise or counter-clockwise direction about the first exhaust pipe 32', according to the engine control module. Alternatively, the actuator assembly can be encased in a housing and mounted as described, or mounted externally to the first exhaust pipe 32 in a sealed housing assembly to prevent leakage of exhaust gas from the exhaust system.

Figure 10:
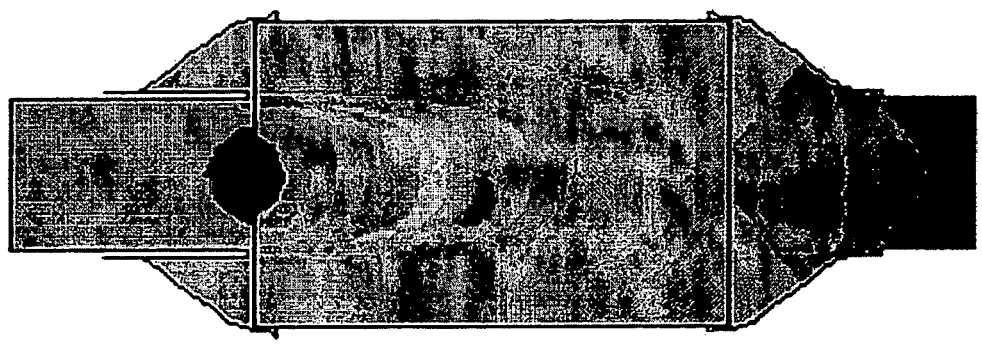
FIG. 10 is a cross-sectional view of a conventional circular catalytic converter with an exemplary variable flow regulator assembly depicting the contours of static pressure of an exhaust gas flow traveling through the variable flow regulator positioned as shown in FIGS. 3 and 7.
Figure 11:
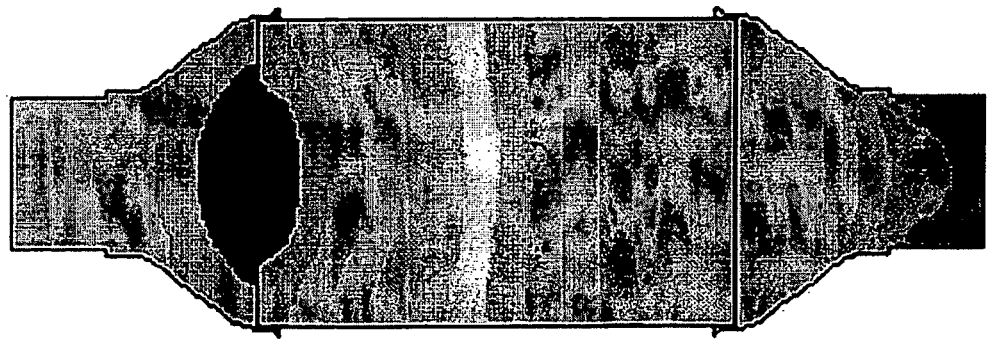
FIG. 11 is a cross-sectional view of a conventional circular catalytic converter without an exemplary variable flow regulator depicting the contours of static pressure of an exhaust gas flow traveling through the catalytic converter.

The exemplary variable flow regulator, when coupled to either a conventional circular or oval shaped catalytic converter, enhances the performance of the catalytic converter by increasing the pressure at which the exhaust gas travels through the converter, as well as the flow maldistribution, and thus quickening the light-off of the catalytic converter. As shown in FIG. 10, the exhaust gas flow is concentrated through the center of the catalyst substrate at a higher pressure, as illustrated by the pressure waves moving from left to right along the x axis, than a catalytic converter operating without a variable flow regulator assembly. As a result, the catalyst substrate's catalytic reaction immediately occurs, thus causing the temperature to increase quickly, and accelerating the light-off. In contrast, FIG. 11 illustrates a conventional catalytic converter operating without a variable flow regulator assembly. The exhaust gas passes through the catalyst substrate at a lower pressure, which does not subsequently accelerate the catalytic reaction or increase the temperature of the catalyst substrate. In an experimental simulation, both variable flow regulator embodiments directed the exhaust gas flow into a circular catalytic converter at a pressure gradient $\Delta P$ of about 6080 pascals (Pa), in comparison to the conventional circular catalytic converter of FIG. 11, which only maintained an exhaust gas flow pressure gradient $\Delta P$ of about 2816 pascals.

Figure 12:
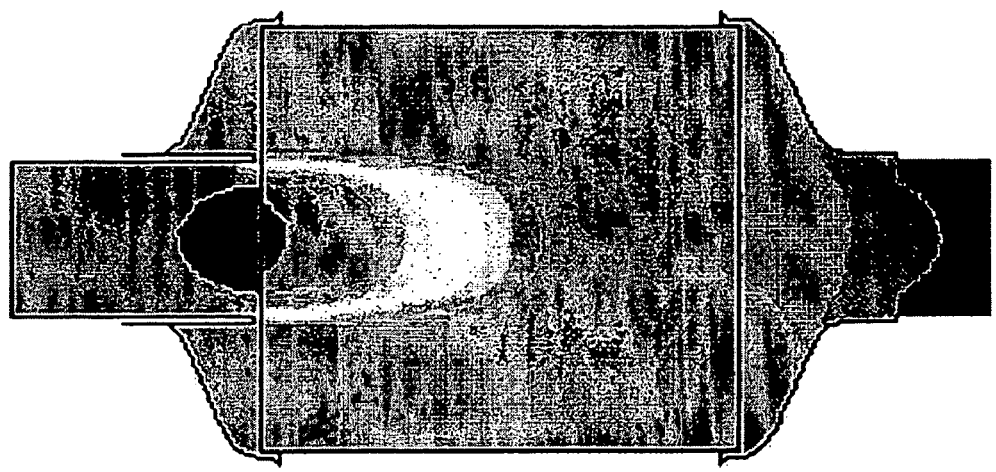
FIG. 12 is a cross-sectional view of a conventional oval shaped catalytic converter with an exemplary variable flow regulator assembly depicting the contours of static pressure of an exhaust gas flow traveling through the variable flow regulator positioned as shown in FIGS. 3 and 7.
Figure 13:
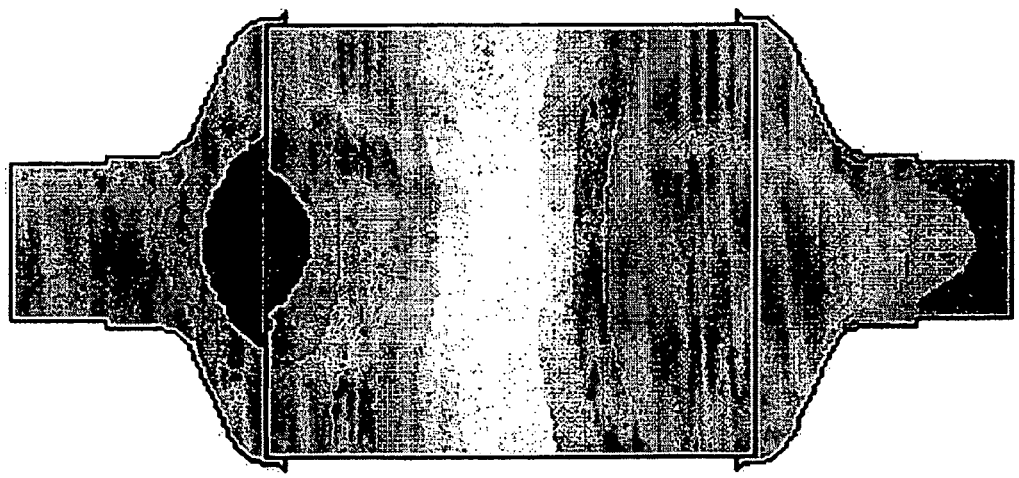
FIG. 13 is a cross-sectional view of a conventional oval shaped catalytic converter without an exemplary variable flow regular depicting the contours of static pressure of an exhaust gas flow traveling through the catalytic converter.

Likewise, in a similar experimental simulation employing an oval shaped catalytic converter in FIGS. 12 and 13, the variable flow regulator directed the exhaust gas flow into the catalytic converter at a pressure gradient ΔP of about 6029 pascals, in comparison to the conventional oval shaped catalytic converter of FIG. 13, which only maintained an exhaust gas flow pressure gradient ΔP of about 2919 pascals. As demonstrated by the pressure waves in FIG. 12, the variable flow regulator concentrated the flow through the catalyst substrate, which accelerated the catalyst reaction occurring within and quickened the light-off. In contrast, the conventional catalytic converter could not concentrate the exhaust gas stream through the center of the catalyst substrate and generate the same benefits as the variable flow regulator, and the pressure gradients reflect this difference.

The variable flow regulator disclosed herein eliminates having to create a richer air/fuel mixture during the initial warming phase to achieve a quicker catalytic converter light-off time. A richer air/fuel mixture can be used to create a greater exothermic oxidation of exhaust elements within the combustion chamber of the vehicle's engine. The exhaust gas stream can increase in temperature and, likewise, cause the catalytic converter to rapidly increase in temperature and facilitate a quicker light-off time. The great disadvantage to enriching the air/fuel mixture is that the vehicle's engine performance is compromised. The conventional arrangement of exhaust engine components cannot be effectively tuned for optimum engine power and engine torque. With regard to the tuning of an engine, the design of the engine outlets should always be considered, so as to provide an optimum volumetric efficiency of the engine. The geometry of conventional exhaust manifolds do not allow any such tuning, which is essential if the engine's performance is to be optimized. The variable flow regulator described herein can optimize catalytic converter light-off without compromising both fuel efficiency and engine performance by directing and concentrating the exhaust gas flow through the center of the catalyst substrate.

While preferred embodiments have been shown and described, various modifications and substitutions may be made thereto without departing from the spirit and scope of the invention. Accordingly, it is to be understood that the present invention has been described by way of illustration and not limitation.

What is claimed is:

1. A variable flow regulator assembly for a catalytic converter comprising a catalyst substrate and a shell disposed about the catalyst substrate, said variable flow regulator comprising:
    a first exhaust pipe attached to the shell and having at least one interference tab concentrically and circumferentially disposed on an interior surface of said first exhaust pipe;
    a second exhaust pipe concentrically disposed within said first exhaust pipe, said second exhaust pipe having an outlet adjacent the catalyst substrate, a first portion attached to the first exhaust pipe and a second portion between the outlet and the first portion and spaced apart from the first exhaust pipe;
    a movable exhaust pipe having at least one interference tab concentrically and circumferentially disposed on an exterior surface of said movable exhaust pipe to engage said at least one interference tab of said first exhaust pipe;
    an actuation mechanism in communication with said first exhaust pipe, said second exhaust pipe and said movable exhaust pipe; and
    said movable exhaust pipe concentrically disposed about the second portion of said second exhaust pipe, and between said first exhaust pipe and said second exhaust pipe.

2. The variable flow regulator assembly recited in claim 1, wherein said actuation mechanism further comprises a mechanism selected from the group consisting of an electrical mechanism, a mechanical mechanism, an electromagnetic mechanism, and combinations comprising at least one of the foregoing.

3. The variable flow regulator assembly recited in claim 1, wherein said actuation mechanism is disposed on the exterior of the variable flow regulator, and configured to be sealingly secured to prevent leakage of exhaust gas.

4. The variable flow regulator assembly recited in claim 1, wherein said actuation mechanism is disposed within said first exhaust pipe, in between said first exhaust pipe and said second exhaust pipe, and behind said movable exhaust pipe.

5. The variable flow regulator assembly recited in claim 4, wherein said actuation mechanism is encased in a housing.

6. The variable flow regulator assembly recited in claim 1, wherein said actuation mechanism is disposed within said first exhaust pipe, and between said first exhaust pipe and said movable exhaust pipe.

7. The variable flow regulator assembly recited in claim 6, wherein said actuation mechanism is encased in a housing.

8. A variable flow regulator assembly adapted to be disposed adjacent a catalyst substrate in catalytic converter, said variable flow regulator comprising:
    a first exhaust pipe having at least one interference tab concentrically and circumferentially disposed on an interior surface of said first exhaust pipe;
    a second exhaust pipe concentrically disposed within said first exhaust pipe;
    a movable exhaust pipe comprising an outlet and having at least one interference tab concentrically and circumferentially disposed on an exterior surface of said exhaust pipe;
    an actuation mechanism in communication with said first exhaust pipe, said second exhaust pipe and said movable exhaust pipe; and
    said movable exhaust pipe having an outlet concentrically disposed about said second exhaust pipe, and between said first exhaust pipe and said second exhaust pipe and having an outlet,
    wherein said movable exhaust pipe is configured to move in a linear direction along said second exhaust pipe from a first position wherein the outlet of the movable exhaust pipe extends beyond the second exhaust pipe toward the catalyst substrate and is spaced apart from the catalyst substrate by a first distance to a second position wherein the outlet of the movable exhaust pipe is spaced apart from the catalyst substrate by a second distance greater than the first distance, and further wherein the interference tab of the movable exhaust pipe engages the interference tab of the first exhaust pipe in the first position.

9. A variable flow regulator assembly for a catalytic converter comprising a catalyst substrate and a shell disposed about the catalyst substrate, said variable flow regulator comprising:
    a first exhaust pipe attached to the shell and having at least one interference tab concentrically and circumferentially disposed on an interior surface of said first exhaust pipe;
    a second exhaust pipe concentrically disposed within said first exhaust pipe, said second exhaust pipe having an outlet adjacent the catalyst substrate, a first portion attached to the first exhaust pipe and a second portion between the outlet and the first portion and spaced apart from the first exhaust pipe;

a movable exhaust pipe having at least one interference tab concentrically and circumferentially disposed on an exterior surface of said movable exhaust pipe to engage said at least one interference tab of said first exhaust pipe; and an actuation mechanism in communication with said first exhaust pipe, said second exhaust pipe and said movable exhaust pipe;

said movable exhaust pipe concentrically disposed about the second portion of said second exhaust pipe, and between said first exhaust pipe and said second exhaust pipe, wherein said movable exhaust pipe is configured to rotate about said second exhaust pipe.

10. The variable flow regulator assembly recited in claim 9, wherein said movable exhaust pipe further comprises a plurality of slots concentrically and circumferentially disposed about an outlet, wherein said second exhaust pipe further comprises a plurality of slots concentrically and circumferentially disposed about an outlet.

11. The variable flow regulator assembly recited in claim 10, further comprising said movable exhaust pipe is configured to rotate about said second exhaust pipe from a first position to a second position, from said second position to a third position, from said second position to said first position, from said third position to said first position, and from said first position to said third position.

12. The variable flow regulator assembly recited in claim 11, wherein said plurality of slots of said second exhaust pipe and said movable exhaust pipe are configured to substantially align at said second position.

13. The variable flow regulator assembly recited in claim 11, wherein said plurality of slots of said second exhaust pipe and said movable exhaust pipe are configured to align at said third position.

14. The variable flow regulator assembly recited in claim 13, wherein said interference tabs of said first exhaust pipe and said movable exhaust pipe are configured to engage and restrict the movement of said movable exhaust pipe at said third position.

* * * * *